United States Patent
Dhankecha et al.

(10) Patent No.: US 12,373,296 B2
(45) Date of Patent: Jul. 29, 2025

(54) FIRMWARE RESILIENCY THROUGH CLOUD

(71) Applicant: Lenovo (Singapore) Pte. Ltd., Singapore (SG)

(72) Inventors: Dharmesh Rameshbhai Dhankecha, Kanagawa (JP); Mikio Hagiwara, Kanagawa (JP); Kazuya Shibayama, Kanagawa (JP); Toyoharu Han, Kanagawa (JP)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 18/409,156

(22) Filed: Jan. 10, 2024

(65) Prior Publication Data
US 2025/0225033 A1   Jul. 10, 2025

(51) Int. Cl.
| | |
|---|---|
| *G06F 11/00* | (2006.01) |
| *G06F 11/07* | (2006.01) |
| *G06F 11/14* | (2006.01) |

(52) U.S. Cl.
CPC ...... *G06F 11/1433* (2013.01); *G06F 11/0772* (2013.01); *G06F 11/1469* (2013.01)

(58) Field of Classification Search
CPC ............ G06F 11/1433; G06F 11/0772; G06F 11/0793; G06F 11/142; G06F 11/1469
See application file for complete search history.

(56) References Cited

U.S. PATENT DOCUMENTS

| | | | | |
|---|---|---|---|---|
| 5,958,062 | A * | 9/1999 | Komasaka | G06F 11/27 714/1 |
| 10,642,623 | B1 * | 5/2020 | Righi | G06F 8/65 |
| 2003/0121033 | A1 * | 6/2003 | Peev | G06F 8/62 714/E11.135 |
| 2006/0277442 | A1 * | 12/2006 | Lantz | G06F 11/0742 714/38.1 |
| 2012/0246629 | A1 * | 9/2012 | Bartel | G06F 8/656 717/168 |
| 2015/0277930 | A1 * | 10/2015 | Sarangdhar | G06F 21/572 713/2 |
| 2016/0335014 | A1 * | 11/2016 | Meng | G06F 3/0644 |
| 2016/0378990 | A1 * | 12/2016 | Goodman | G06F 21/572 726/19 |
| 2017/0322796 | A1 * | 11/2017 | Kim | G06F 9/4406 |
| 2018/0322012 | A1 * | 11/2018 | Sharma | G06F 21/572 |
| 2020/0226260 | A1 * | 7/2020 | Aggarwal | G06F 21/566 |

(Continued)

*Primary Examiner* — Philip Guyton
(74) *Attorney, Agent, or Firm* — Osha Bergman Watanabe & Burton LLP

(57) ABSTRACT

A method of operating a computing system, including a computing device and a docking hub, includes: uploading, by the computing device to a network, identification information of the computing device and a firmware version information of an installed firmware on the computing device; detecting an error in the installed firmware; transmitting, from an embedded controller of the computing device to the docking hub, a first request message including the identification information; transmitting, from the docking hub to the network, a second request message including the identification information; retrieving, by the docking hub from the network, a backup firmware corresponding to the firmware version information; and installing the backup firmware to the computing device.

7 Claims, 5 Drawing Sheets

(56) References Cited

U.S. PATENT DOCUMENTS

| | | | |
|---|---|---|---|
| 2022/0066885 A1* | 3/2022 | Samuel | G06F 11/1464 |
| 2023/0046674 A1* | 2/2023 | Liu | G06F 11/1469 |
| 2024/0211350 A1* | 6/2024 | Bhatia | G06F 11/1417 |

* cited by examiner

FIRMWARE RESILIENCY THROUGH CLOUD

TECHNICAL FIELD

The present disclosure relates to a method of locally restoring a firmware installed on a computing device.

BACKGROUND

When an error is present in a firmware of a computing device, one or more functionalities of the computing device may be lost (e.g., non-bootable, loss of hardware integration) until a valid firmware version is restored. If a local restoration process of the computing device fails (e.g., corruption of local backup firmware version) and/or a user of the computing device does not have the technical expertise to address the error in the firmware, the computing device may be shipped to a remote service center with experts that can restore the system or provide a replacement. This remote servicing process may introduce significant inconvenience and cost (e.g., time, cost, manpower) to the user, manufacturer, and service provider.

SUMMARY

In general, one or more embodiments of the invention relate to a method of operating a computing system including a computing device and a docking hub. The method includes: uploading, by the computing device to a network, identification information of the computing device and a firmware version information of an installed firmware on the computing device; detecting an error in the installed firmware; transmitting, from an embedded controller of the computing device to the docking hub, a first request message including the identification information; transmitting, from the docking hub to the network, a second request message including the identification information; retrieving, by the docking hub from the network, a backup firmware corresponding to the firmware version information; and installing the backup firmware to the computing device.

In general, one or more embodiments of the invention relate to a non-transitory computer readable medium (CRM) storing computer readable program code for operating a computing system including a computing device and a docking hub. The computer readable program code causes the computer system to: upload, by the computing device to a network, identification information of the computing device and a firmware version information of an installed firmware on the computing device; detect an error in the installed firmware; transmit, from an embedded controller of the computing device to the docking hub, a first request message including the identification information; transmit, from the docking hub to the network, a second request message including the identification information; retrieve, by the docking hub from the network, a backup firmware corresponding to the firmware version information; and install the backup firmware to the computing device.

In general, one or more embodiments of the invention relate to a computer system comprising: a computing device with an embedded controller; and a docking hub configured to communicate with the computing device and a network. The computing system is configured to: upload, by the computing device to the network, identification information of the computing device and a firmware version information of an installed firmware on the computing device; detect an error in the installed firmware; transmit, from the embedded controller of the computing device to the docking hub, a first request message including the identification information; transmit, from the docking hub to the network, a second request message including the identification information; retrieve, by the docking hub from the network, a backup firmware corresponding to the firmware version information; and install the backup firmware to the computing device.

Other aspects of the invention will be apparent from the following description and the appended claims.

DETAILED DESCRIPTION

Figure 1A:
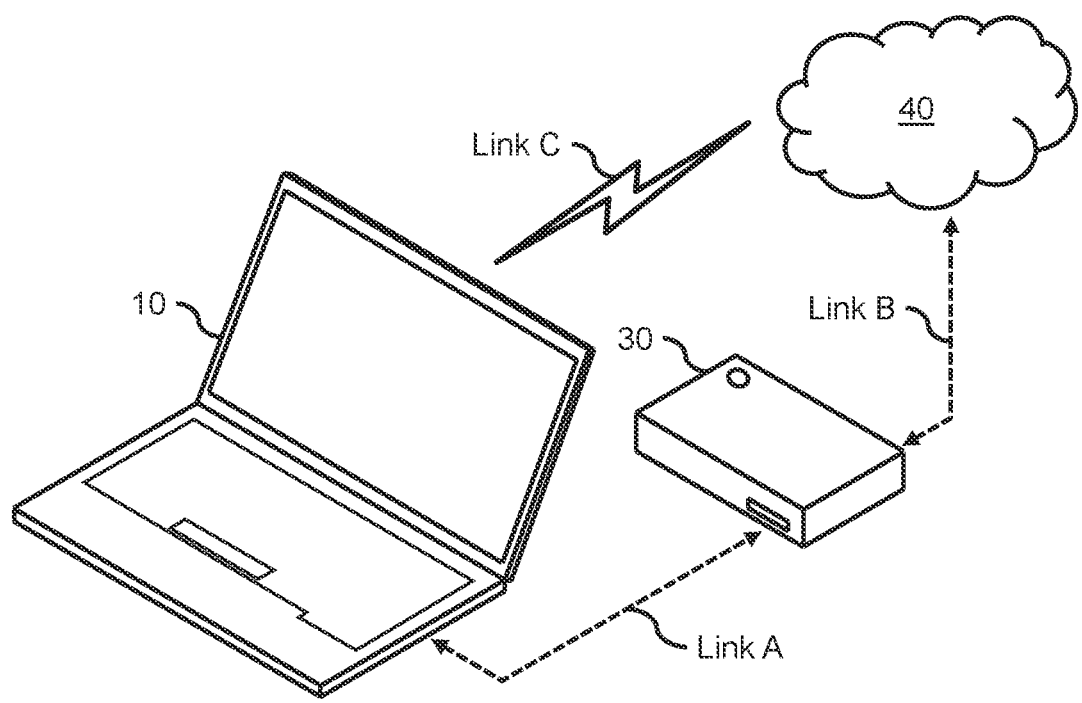
FIG. 1A shows a perspective view of a computing system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Generally, a computing device includes a plurality of firmware settings (i.e., firmware or firmware modules) that provide control or management functions for the specific hardware configuration of the computing device. Because firmware include basic functions for operating the computing device, the firmware is held in non-volatile memory (e.g., read-only memory, flash memory regions, erasable programmable read-only memory (EPROM), electrically erasable programmable read-only memory (EEPROM)) that is separate from other memory resources (e.g., random access memory (RAM), storage devices) of the computing device. While data stored in the other memory resources of the computing device may be constantly written, read, rewritten, and/or erased, specialized procedures may be required to modify or update firmware versions. Furthermore, because a valid firmware version is required for proper operation of the computing device, additional security authorizations may be required to perform the specialized procedures to change the firmware of the computing device.

In general, embodiments of the invention provide a method of locally restoring a valid firmware version onto a computing device using a connected docking hub. With the introduction of computing systems that include a computing device supported by a docking hub (e.g., a PC/laptop docking station, a port replicator, a multi-port adapter/expander, a peripheral equipment), the docking hub provides a local platform that can assist in restoring the computing device. Because the docking hub is independent from the firmware error of the computing device, the docking hub can be relied upon as a fully functional and trusted component of the computing system.

FIG. 1A shows a perspective view of a computing system in accordance with one or more embodiments of the invention.

The computing system includes a computing device 10 (e.g., laptop personal computer (PC), tablet PC, desktop PC, convertible PC) and a docking hub 30. The computing device 10 is discussed in further detail below with respect to FIG. 1B. The docking hub 30 is an independent device that supports the computing device 10 by providing additional functionality. For example, a docking hub 30 may include additional communication ports (e.g., universal serial bus ports), audiovisual ports (e.g., audio input/output ports, addition monitor support), a power connection, etc.

The computing system further includes a communication link A (i.e., link A) that connects the computing device 10 and the docking hub 30. In one or more embodiments, the link A may further include a power connection between the computing device 10 and the docking hub 30. For example, the link A may be a USB-C to USB-C line (CC line) that provides the computing device 10 with power (e.g., via an external power source (not shown) connected to the docking hub 30) and access to an external network 40 (e.g., a local area network (LAN), a wide area network (WAN) such as the Internet, mobile network, or any other type of network) via the docking hub 30.

The computing system further includes a communication link B (i.e., link B) that connects the docking hub 30 to the external network 40. In one or more embodiments, the link B may be a direct or indirect wired network connection (e.g., ethernet connection) or wireless network connection between the docking hub 30 and the network 40.

The computing system further includes a communication link C (i.e., link C) that connects the computing device 10 to the external network 40. In one or more embodiments, the link C may be a direct or indirect wired network connection (e.g., ethernet connection) or wireless network connection between the computing device 10 and the network 40 that does not include the docking hub 30.

Figure 1B:
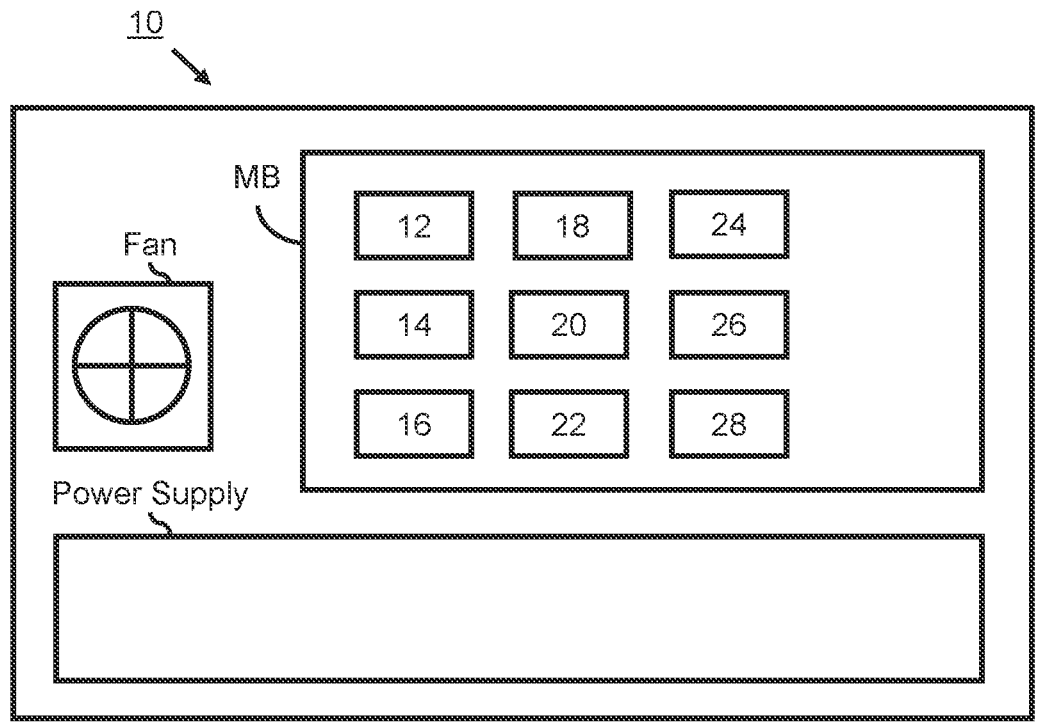
FIG. 1B shows a schematic of various subcomponents included in the computing device of FIG. 1 in accordance with one or more embodiments of the invention.

FIG. 1B shows a schematic of various subcomponents included in the computing device 10 of FIG. 1 in accordance with one or more embodiments of the invention.

The computing device 10 includes a motherboard MB with a plurality of subcomponents. The subcomponents installed on the motherboard MB may include a processor 12 (e.g., a central processing unit (CPU)), a memory 14, a graphic processing unit (GPU) 16 (e.g., a video subsystem), a power control circuit 18, a firmware memory 20 (e.g., a Serial Peripheral Interface (SPI) flash region), an embedded controller 22, a chipset 24, a network interface 26 (e.g., wired or wireless connection port(s) that manage communication via link C), and a storage device 28 (e.g., hard disk drive (HDD), a solid state drive (SSD)). The computing device 10 may further include a fan, and a power supply.

In one or more embodiments, the above subcomponents of the computing device 10 may be omitted, included in multiple quantities, combined as a single subcomponent (e.g., a processor that acts as a controller of one or more subcomponents), and/or disposed in other portions of the computing device 10 or computing system. Furthermore, the functions of each subcomponent described above may be split across multiple subcomponents, implemented in hardware (e.g., circuitry, physical components), implemented in software (e.g., machine code, programming on non-transitory computer readable media), or any combination thereof. Further, it will be appreciated that other subcomponents (e.g., devices/memory, peripheral elements, removeable components, external power supplies) beyond those listed above may be included, internally or externally, as a subcomponent of the computing device 10 without departing from the scope of the present disclosure.

Figure 1C:
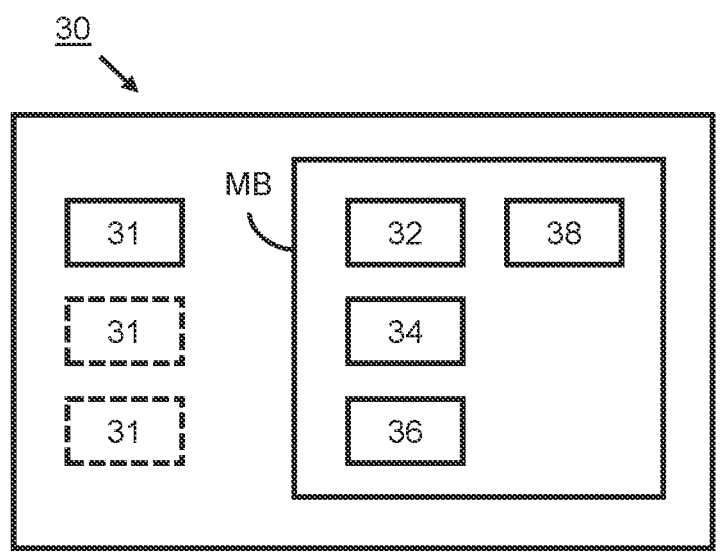
FIG. 1C shows a schematic of various subcomponents included in the docking hub of FIG. 1 in accordance with one or more embodiments of the invention.

FIG. 1C shows a schematic of various subcomponents included in the docking hub 30 of FIG. 1 in accordance with one or more embodiments of the invention.

The docking hub 30 includes a plurality of subcomponents (e.g., installed on a motherboard or printed circuit board) in addition to one or more ports 31 (e.g., port for CC line to computing device 10, additional data/audiovisual ports). The subcomponents may include a microcontroller 32 (e.g., a CPU), a memory 34, a network interface 36 (e.g., wired or wireless connection port(s) that manage communication via link B), and a power control circuit 38 (e.g., power delivery (PD) controller). While not shown, the docking hub 30 may further include any subcomponent as described above with respect to the computing device 10 or any other appropriate subcomponent.

In one or more embodiments, the above subcomponents of the docking hub 30 may be omitted, included in multiple quantities, combined as a single subcomponent (e.g., a processor that acts as a controller of one or more subcomponents), and/or disposed in other portions of the docking hub 30 or computing system. Furthermore, the functions of each subcomponent described above may be split across multiple subcomponents, implemented in hardware (e.g., circuitry, physical components), implemented in software (e.g., machine code, programming on non-transitory computer readable media), or any combination thereof. Further, it will be appreciated that other subcomponents (e.g., devices/memory, peripheral elements, removeable components, external power supplies) beyond those listed above may be included, internally or externally, as a subcomponent of the computing device 10 without departing from the scope of the present disclosure.

Figure 2:
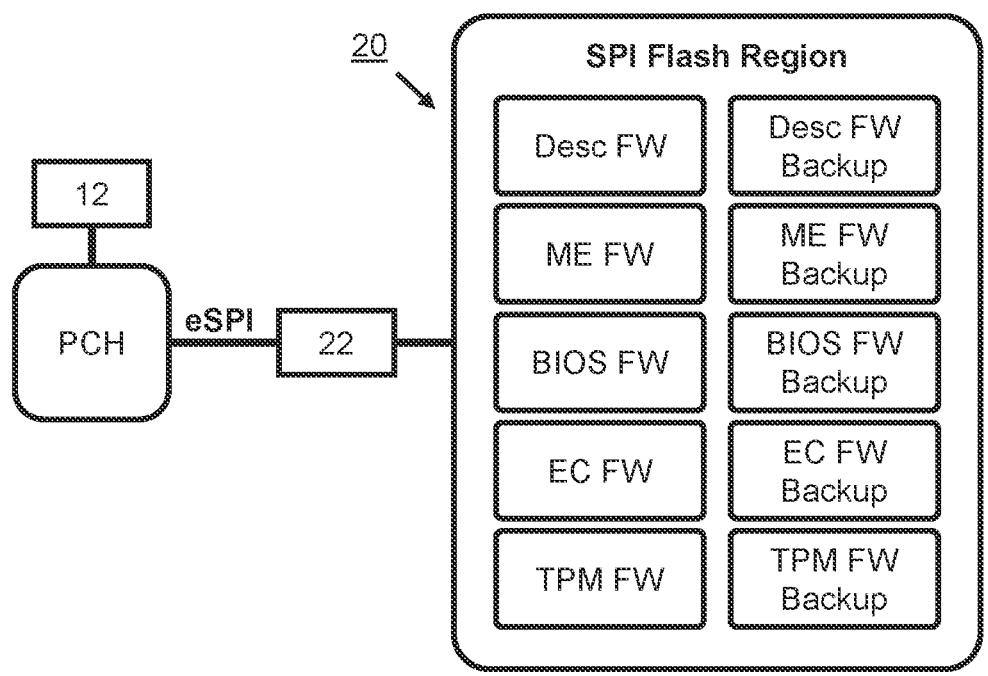
FIG. 2 shows a schematic of a firmware configuration in the computing device of FIG. 1 in accordance with one or more embodiments of the invention.

FIG. 2 shows a schematic of a firmware configuration in the computing device 10 of FIG. 1 in accordance with one or more embodiments of the invention.

The computing device 10 includes the firmware memory 20 that may include a flash memory region (e.g., SPI flash region) holding the various firmware modules of the computing device 10. The firmware memory 20 may include one or more of the following as installed firmware on the computing device 10: a descriptor firmware (DESC FW) 1 a management engine firmware (ME FW); a basic input/output system firmware (BIOS FW); an embedded controller firmware (EC FW); a trusted platform module firmware (TPM FW); any appropriate firmware used by the computing device 10. The firmware memory 20 may further include a local backup version of any of the above firmware modules.

The firmware memory 20 is reprogrammable (e.g., to provide updates to the installed firmware, to perform restoration of the installed firmware in the case of an error or corruption). In one or more embodiments, the embedded controller 22 controls modifications to the firmware memory 20. For example, a platform controller hub (PCH) of the computing device 10 may coordinate functions between the main processor 12 (e.g., CPU) of the computing device 10 and the embedded controller 22 (e.g., via an enhanced SPI (eSPI) protocol) to perform any modification of the firmware memory 20.

While FIG. 2 describes embodiments of the invention including a PCH chipset and eSPI it will be appreciated that alternative configurations, chipsets, and protocols may be used to perform the invention. For example, a different subcomponent of the computing system 10 in FIG. 1B may be configured to manage the firmware memory 20 and a different communication protocol may be utilized.

When an error is detected in the installed firmware of the computing device 10, the embedded controller 22 may attempt a restoration process using the corresponding backup firmware that is locally stored within the firmware memory 20. However, when the error in the installed firmware limits the functionality of the computing device 10 (e.g., becomes non-bootable, corruption or loss of access to some or all of the firmware memory 20), this local backup restoration process may become impossible. As explained in further detail below with respect to FIG. 3, the docking hub 30 may be utilized as a trusted entity to coordinate restoration of the firmware memory 20.

Figure 3:
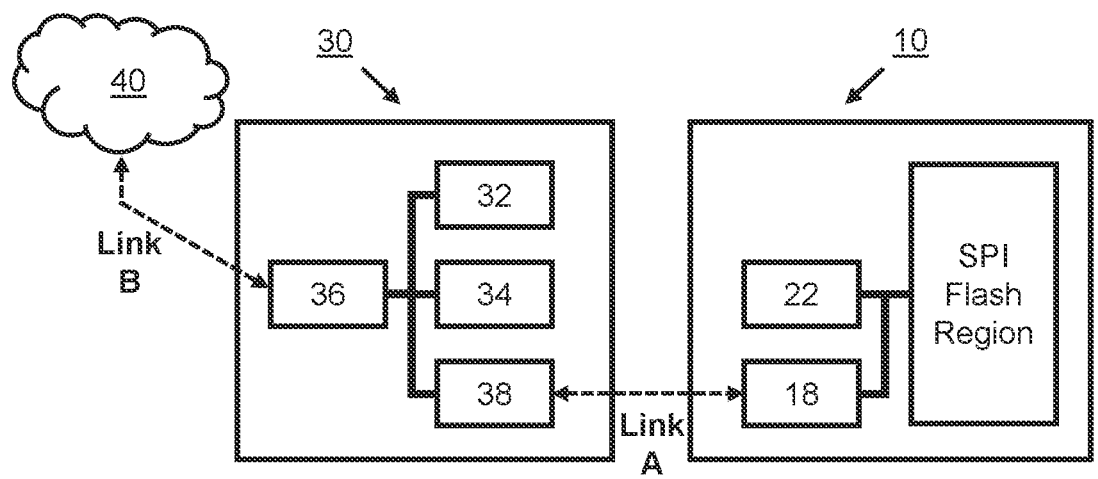
FIG. 3 shows a firmware restoration configuration in the computing system of FIG. 1 in accordance with one or more embodiments of the invention.

FIG. 3 shows a firmware restoration configuration in the computing system of FIG. 1 in accordance with one or more embodiments of the invention.

Embodiments of the invention leverage the link A between the computing device 10 and the docking hub 30 to retrieve and install the backup firmware from the network 40. As described in further detail below, even in a case where a firmware error causes a loss of functionality in the computing device 10, the functional hardware of the connected docking hub 30 may be leveraged to coordinate retrieval of a backup firmware from the network 40 via this interconnection.

The link A is managed by the power circuit controller 18 in the computing device 10 and the power circuit controller 38 in the docking hub 30. The microcontroller 32 of the docking hub 30 is communicatively coupled to the power control circuit 38. Similarly, the embedded processor 22 of the computing device 10 is communicatively coupled to the power control circuit 18. Via these connections, the computing system of FIG. 1 may be configured to allow for the embedded controller 22 to access functionality of the docking hub 30.

For example, when the network interface 16 of the computing device 10 is non-functional due to an error in the installed firmware, the network interface 36 of the docking hub 30 may be instructed to send and receive information to and from the network 40 on behalf of the embedded controller 22. Alternatively, or in addition, when the memory 14 of the computing device 10 is non-functional due to an error in the installed firmware, the memory 34 of the docking hub 30 may be used to store information (e.g., a backup firmware) on behalf of the embedded controller 22.

While embodiments in this description are based upon a CC line as the link A, it will be appreciated that other embodiments of the invention may utilize a different hardware configuration and/or communication protocol between the computing device 10 and the docking hub 30.

Figure 4:
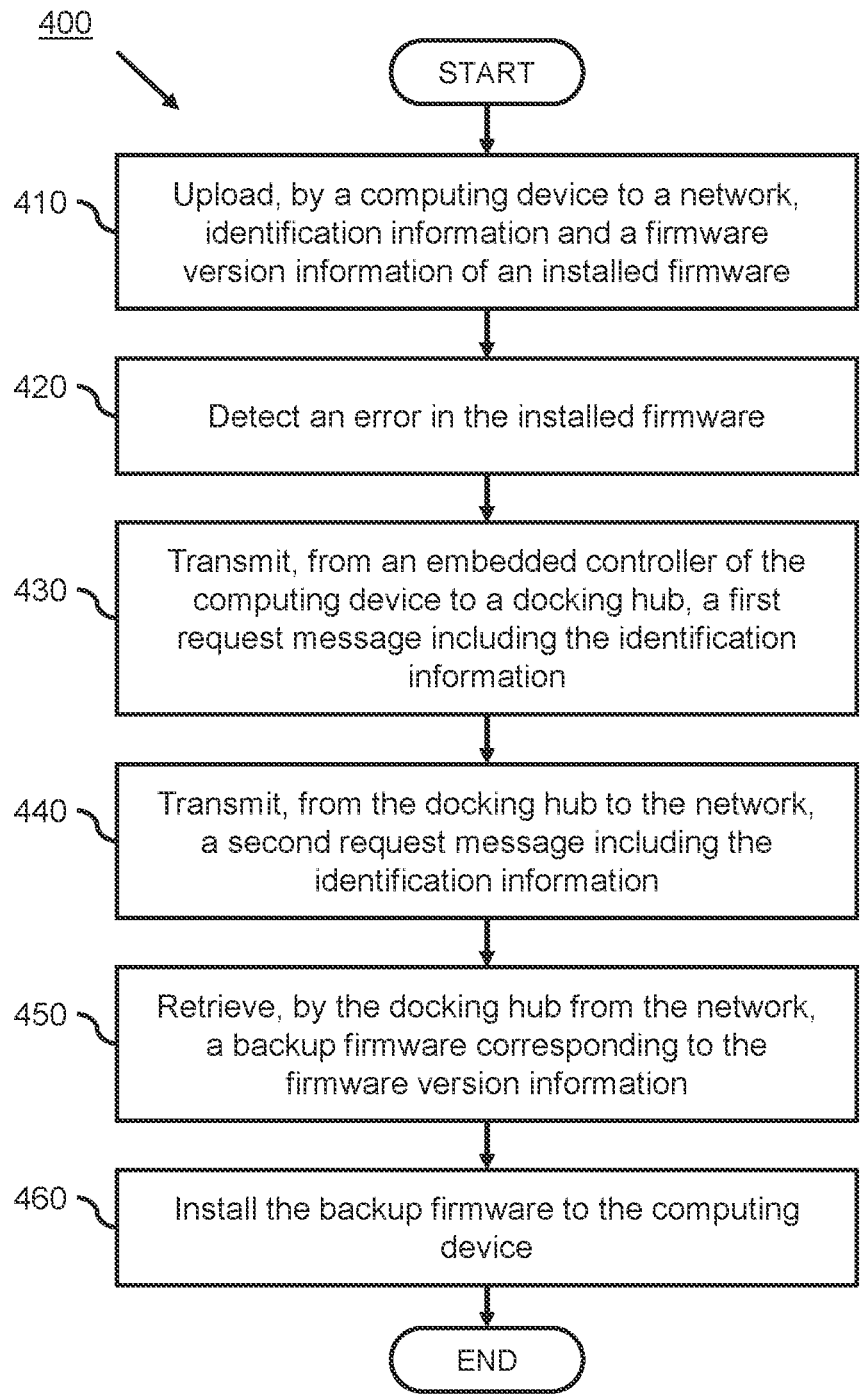
FIG. 4 shows a flowchart of a method in accordance with one or more embodiments of the invention.
Figure 5:
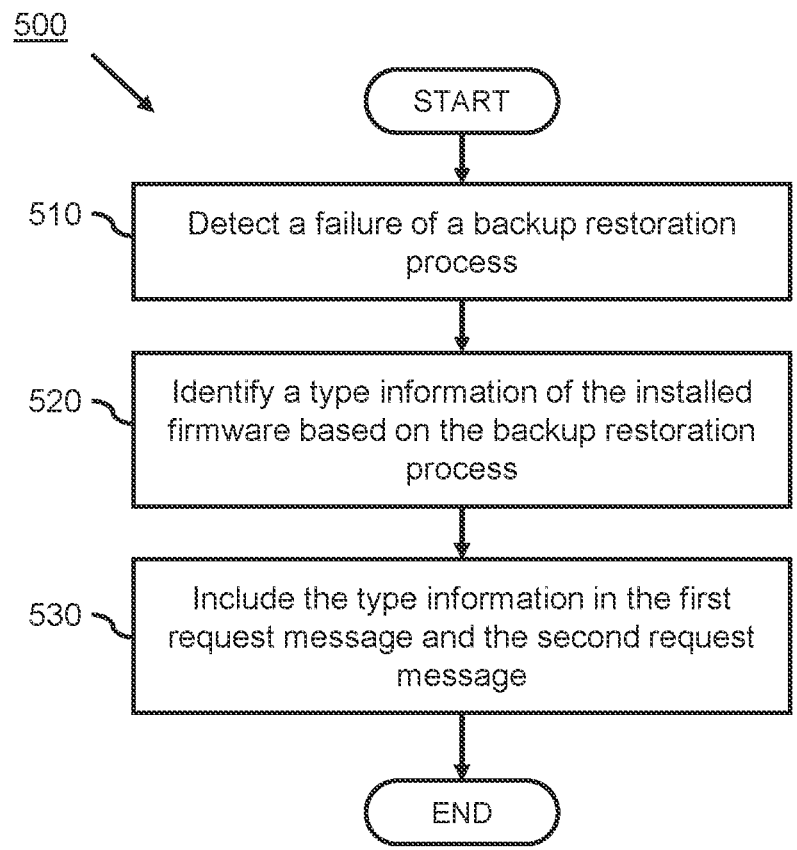
FIG. 5 shows a flowchart of a method in accordance with one or more embodiments of the invention.

FIGS. 4-5 show flowcharts describing example methods 400, 500 for a computing system to perform a firmware restoration process in accordance with one or more embodiments. One or more of the processes in FIGS. 4-5 may be performed by various components of the computing system described with reference to FIGS. 1A-3. The methods 400, 500 may be executed in part by one or more processors (e.g., the processor 12, the embedded controller 22, the microcontroller 32).

FIG. 4 shows a flowchart of a method 400 in accordance with one or more embodiments of the invention.

At 410, identification information of the computing device 10 and a firmware version information of an installed firmware on the computing device 10 is uploaded to the network 40 by the computing device 10. The firmware version information is associated with the identification information such that the identification information may be used to identify the corresponding firmware version information.

The identification information may include a machine type model (MTM), a serial number (SN) information, a security key such as an embedded key/flag/token, any appropriate system/device identification information, or a combination of any of the above.

The firmware version information may include information elements for each of the firmware modules installed in the firmware memory 20. In one or more embodiments, each information element in the firmware version information may include a type of the corresponding firmware module and the last known valid version of the corresponding firmware module.

In one or more embodiments, the identification information and the firmware version information are uploaded to a cloud service included in a networking feature of the operating system of the computing device 10.

In one or more embodiments, the firmware version information and the identification information may be uploaded to the network 40 directly from the computing device 10 (e.g., via link C, when the computing device 10 is being operated without the docking hub 30). Alternatively, the firmware version information and the identification information may be uploaded by the docking hub 30 via the CC line (e.g., when the computing device 10 is being operated while connected to the docking hub 30).

At 420, an error is detected in the installed firmware. In one or more embodiments, the embedded controller 22 may be configured to detect errors (e.g., corruption) in the firmware memory 20. For example, the error may be detected by validation of initial boot blocks (i.e., IBB validation), post IBB validation, detection by a watchdog timer driver (WTD), receiving an error from a subcomponent of the computing device 10, any appropriate firmware validation process, or a combination of one or more processes.

At 430, a first request message including the identification information of the computing device 10 is transmitted from the embedded controller 22 of the computing device 10 to the docking hub 30. In one or more embodiments, the firmware version information of the installed firmware with the error is also included in the first request message.

As discussed above, the embedded controller 22 may leverage the power circuit controller 18 and the link A to facilitate communication between the computing device 10 and the docking hub 30.

In one or more embodiments, the first request message may be a vendor defined message utilizing the USB-PD (universal serial bus power delivery) communication link across a CC line that forms the link A.

At 440, a second request message including the identification information is transmitted from the docking hub 30 to the network 40. In one or more embodiments, the firmware version information of the installed firmware with the error is also included in the second request message.

As discussed above, the embedded controller 22 may leverage the power circuit controller 18, the CC line, and the subcomponents of the ducking hub 30 (e.g., the microprocessor 32, the network interface 36) to facilitate communication between the computing device 10 and the network 40.

In one or more embodiments, the second request message is transmitted to the cloud service included in the networking feature of the operating system of the computing device 10.

At 450, a backup firmware corresponding to the firmware version information is received by the docking hub 30 from the network 40. Based on the second request message, the network 40 correlates the identification information with the previously uploaded firmware version information to identify and provide the backup firmware corresponding to the last know valid installed firmware. Alternatively, when the second request message includes the firmware version information of the installed firmware with the error, the backup firmware corresponding to the last known valid installed firmware may be directly identified.

In one or more embodiments, the backup firmware may be downloaded to a memory 34 of the docking hub 30. Alternatively, the backup firmware may be downloaded to a memory 14 of the computing device 10, if functional.

At 460, the backup firmware is installed to the computing device 10. Leveraging the connections with one or more subcomponents of the docking hub 30 (e.g., the microcontroller 32, the memory 34, the network interface 36), via the power circuit controllers 18/38 and the link A, the embedded controller 22 installs the backup firmware from the network 40 to restore the firmware memory 20. Because the embedded controller 22 possesses root-of-trust access to the firmware memory 20 (e.g., all SPI flash regions), the chain of interactions between the computing device 10, the docking hub 30, and the network 40 is secure.

In one or more embodiments, the method 400 is utilized in a secondary firmware restoration process (e.g., after the computing device 10 fails to restore the installed firmware based on a corresponding backup version stored in the firmware memory 20). In alternative embodiments, the method 400 may also be used as a primary method of restoring the firmware memory 20.

In one or more embodiments, the method 400 may permit the removal of one or more local firmware backups in the computing device 10 and increase the available resources of the computing device 10 (e.g., reduce the requirements of firmware memory 20).

FIG. 5 shows a flowchart of a method 500 in accordance with one or more embodiments of the invention.

At 510, a failure of a backup restoration process is detected. As discussed above, in one or more embodiments, the firmware restoration process via the docking hub 30 is utilized as a secondary firmware restoration process after the computing device 10 fails to a complete a primary firmware restoration process. For example, the embedded controller 22 may initially try to restore an error in the installed firmware by using a corresponding backup version (i.e., a backup restoration process) of the firmware module that is also stored in the firmware memory 20 (e.g., a local backup in the SPI Flash Region). The failure of the primary firmware restoration process may provide additional information that can be used in method 400.

At 520, a type information of the installed firmware is identified based on the backup restoration process. For example, the primary firmware restoration may identify the type of the installed firmware with the error in order to access the corresponding backup version in the firmware memory 20.

At 530, the type information is included in the first request message and the second request message. In one or more embodiments, when the first and second request messages include the firmware version information with a type of the installed firmware with the error, the backup firmware corresponding to the last known valid installed firmware may be directly identified.

One or more of the individual processes shown in the flowcharts of FIGS. 4 and 5 may be omitted, repeated, combined, and/or performed in a different order than the order shown in this disclosure. Each process may be implemented by hardware (e.g., circuitry, physical components), software (e.g., machine code, programming on non-transitory computer readable media), or any combination thereof. The processes may be performed actively or passively. For example, some steps may be performed using polling or may be interrupt driven in accordance with one or more embodiments of the invention. Additional processes may be performed. Accordingly, the scope of the invention should not be limited by the specific arrangement as depicted in FIGS. 4 and 5.

Embodiments of the invention may be implemented on virtually any type of computing device 10 or docking hub 30, regardless of the platform being used.

For example, the computing device 10 may be one or more mobile devices (e.g., laptop computer, smart phone, personal digital assistant, tablet computer, or other mobile device), desktop computers, servers, blades in a server chassis, or any other type of computing device or devices that includes at least the minimum processing power, memory, and input and output device(s) (e.g., a display 14) to perform one or more embodiments of the invention. For example, the computing device 10 may include one or more computer processor(s), associated memory (e.g., random access memory (RAM), cache memory, flash memory), one or more storage device(s) (e.g., a hard disk, a solid state drive, an optical drive such as a compact disk (CD) drive or digital versatile disk (DVD) drive, a flash memory stick), and numerous other elements and functionalities. The computer processor(s) may be an integrated circuit for processing instructions. For example, the computer processor(s) may be one or more cores, or micro-cores of a processor. The computing device 10 may also include one or more input device(s), such as a camera, imager, touchscreen, keyboard, mouse, microphone, touchpad, electronic pen, or any other type of input device. Further, the computing device 10 may include one or more output device(s), such as a projector, screen (e.g., an OLED display or other pixel addressable display device), an external storage, or any other output device. One or more of the output device(s) may be the same or different from the input device(s). The computing device 10 may be connected to a network 40 via a network interface 26 and/or via a network interface 36 of the docking hub 30. The input and output device(s) may be directly or indirectly (e.g., via the docking hub 30 or the network 40) connected to the computer processor(s), memory, and storage device(s). Many different types of computing devices 10 exist, and the aforementioned input and output device(s) may take other forms.

Similarly, the docking hub 30 may be one or more devices that include at least the minimum processing power, memory, and input and output device(s) (e.g., an interface/ port 31 for link A, a network interface 36 for link B with the network 40) to perform one or more embodiments of the invention.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the invention.

One or more of the embodiments of the invention may have one or more of the following improvements to computing devices: reducing inconvenience and cost (e.g., time, cost, manpower) to the user, manufacturer, and service provider of a computing device; increasing available computing resources (e.g., firmware memory, ROM) or reducing minimum requirements of a computing device by allowing for remote storage of backup firmware. These advantages further demonstrate a practical application by providing an additional method of firmware recovery of a computing device.

Although the disclosure has been described with respect to a limited number of embodiments, those skilled in the art, having benefit of this disclosure, will appreciate that various other embodiments may be devised without departing from the scope of the present invention. Accordingly, the scope of the invention should be limited only by the attached claims.

REFERENCE NUMERALS 10 computing device
12 processor
14 memory
16 graphics processing unit
18 power circuit controller
20 firmware memory
22 embedded controller
24 chipset
26 network interface
28 storage device
30 docking hub
31 port
32 processor
34 memory
36 network interface
38 power circuit controller
40 network
A communication link A
B communication link B
C communication link C
PCH Platform Controller Hub
eSPI Enhanced Serial Peripheral Interface

What is claimed is:

1. A method of operating a computing system including a computing device and a docking hub, the method comprising:
uploading, by the computing device to a network, identification information of the computing device and a firmware version information of an installed firmware on the computing device;
detecting an error in the installed firmware;
transmitting, from an embedded controller of the computing device to the docking hub, a first request message including the identification information;
transmitting, from the docking hub to the network, a second request message including the identification information;
retrieving, by the docking hub from the network, a backup firmware corresponding to the firmware version information; and
installing the backup firmware to the computing device,
wherein the backup firmware is downloaded to a memory of the docking hub,
wherein the backup firmware is installed to the computing device from the docking hub,
wherein the embedded controller provides the docking hub with root-of-trust access to a firmware memory of the computing device for installing the backup firmware,
wherein the first request message and the backup firmware are transmitted utilizing a predetermined communication protocol managed by power delivery controllers in each of the computing device and the docking hub, and
wherein the embedded controller provides the root-of-trust access to the power delivery controllers for installing the backup firmware.

2. The method of claim 1,
wherein detecting the error in the installed firmware of the computing device includes detecting corruption in the installed firmware and detecting a failure of a backup restoration process.

3. The method of claim 2, further comprising:
identifying a type information of the installed firmware with the error based on the backup restoration process,
wherein the first request message and the second request message include the type information.

4. The method of claim 1,
wherein a firmware memory of the computing device includes a serial peripheral interface flash region with a read-only memory portion corresponding to the installed firmware.

5. The method of claim 4, further comprising:
providing, by the embedded controller to the docking hub, root-of-trust access to the read-only memory portion corresponding to the installed firmware.

6. A non-transitory computer readable medium (CRM) storing computer readable program code for operating a computing system that includes a computing device and a docking hub, the computer readable program code causes the computing system to:
upload, by the computing device to a network, identification information of the computing device and a firmware version information of an installed firmware on the computing device;
detect an error in the installed firmware;
transmit, from an embedded controller of the computing device to the docking hub, a first request message including the identification information;
transmit, from the docking hub to the network, a second request message including the identification information;
retrieve, by the docking hub from the network, a backup firmware corresponding to the firmware version information; and
install the backup firmware to the computing device,
wherein the backup firmware is downloaded to a memory of the docking hub,
wherein the backup firmware is installed to the computing device from the docking hub, wherein the embedded controller provides the docking hub with root-of-trust access to a firmware memory of the computing device for installing the backup firmware, wherein the first request message and the backup firmware are transmitted utilizing a predetermined communication protocol managed by power delivery controllers in each of the computing device and the docking hub, and wherein the embedded controller provides the root-of-trust access to the power delivery controllers for installing the backup firmware.

7. A computing system comprising:

a computing device with an embedded controller; and a docking hub configured to communicate with the computing device and a network, wherein the computing system is configured to:
- upload, by the computing device to the network, identification information of the computing device and a firmware version information of an installed firmware on the computing device;
- detect an error in the installed firmware;
- transmit, from the embedded controller of the computing device to the docking hub, a first request message including the identification information;
- transmit, from the docking hub to the network, a second request message including the identification information;
- retrieve, by the docking hub from the network, a backup firmware corresponding to the firmware version information; and
- install the backup firmware to the computing device, wherein the backup firmware is downloaded to a memory of the docking hub, wherein the backup firmware is installed to the computing device from the docking hub, wherein the embedded controller provides the docking hub with root-of-trust access to a firmware memory of the computing device for installing the backup firmware, wherein the first request message and the backup firmware are transmitted utilizing a predetermined communication protocol managed by power delivery controllers in each of the computing device and the docking hub, and wherein the embedded controller provides the root-of-trust access to the power delivery controllers for installing the backup firmware.

* * * * *